June 20, 1933.   J. H. REESE   1,914,648
HEAT INSULATING COVERING
Filed Dec. 17, 1928   2 Sheets-Sheet 2
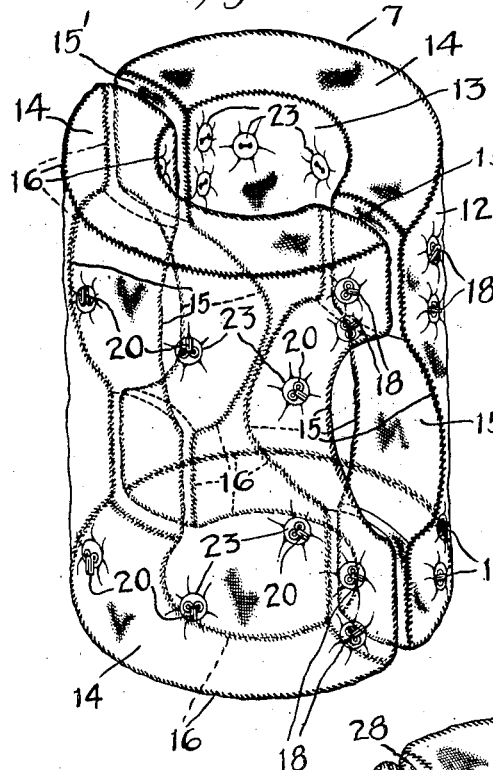
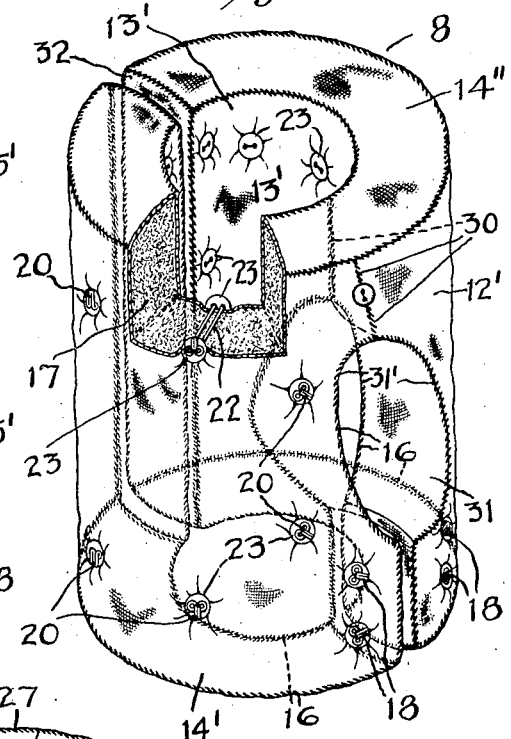
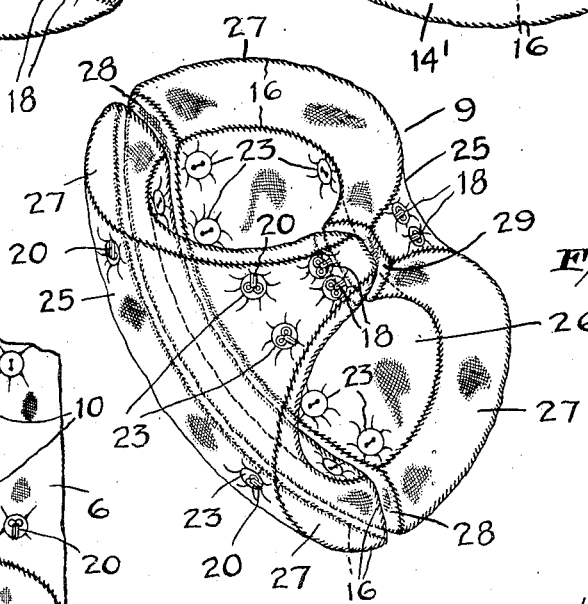
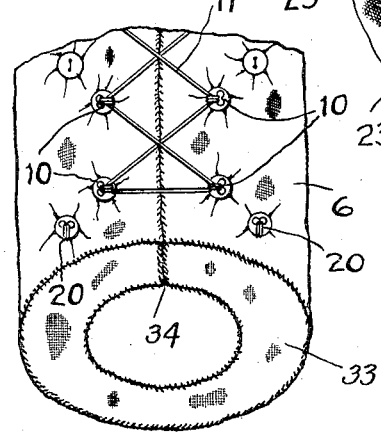
INVENTOR
John H. Reese
BY
D. H. Halstead, ATTORNEY Patented June 20, 1933

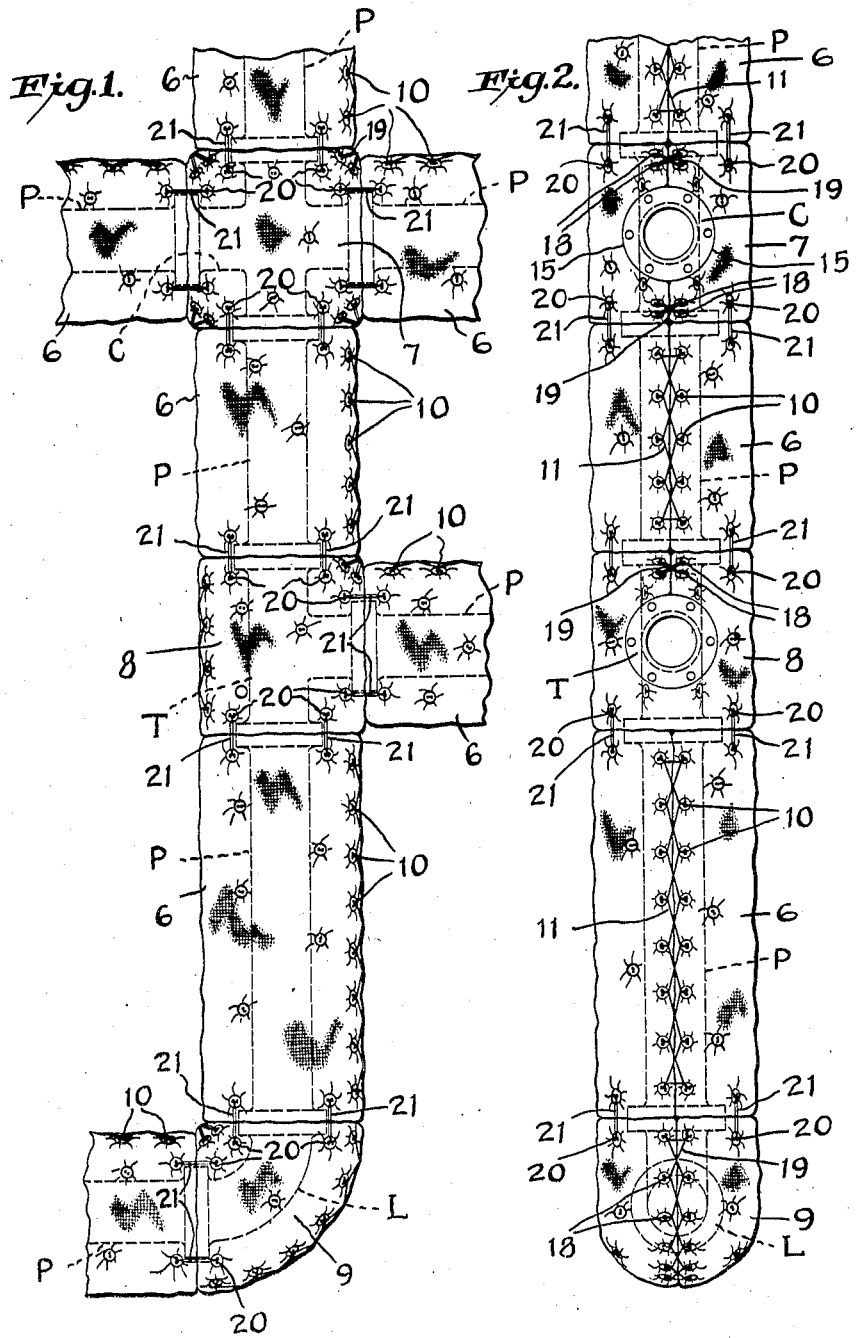

1,914,648

UNITED STATES PATENT OFFICE

JOHN H. REESE, OF SOMERVILLE, NEW JERSEY, ASSIGNOR TO JOHNS-MANVILLE CORPORATION, OF NEW YORK, N. Y., A CORPORATION OF NEW YORK

HEAT INSULATING COVERING

Application filed December 17, 1928. Serial No. 326,572.

This invention relates to improvements in non-conducting coverings or casings for pipe systems, and one of the primary objects is to make a plurality of prebuilt coverings or blankets which are adapted to cover all the fittings and parts that are ordinarily used in piping systems, such as straight line sections having in combination therewith valves, T's, crosses, elbows, etc.

Another object of this invention is to make a plurality of co-operative flexible non-conducting fittings or casings which are adapted to be readily installed and easily replaced on piping systems while the same are in operation.

A further object of this invention is to provide a combination of flexible preformed semi-shaped and indestructible fittings which are adapted to cover all the parts constituting a piping system and to be bound thereto, and to each other in close fitting contact so as to effectively prevent heat or cold transmission.

Another important purpose of this invention is to provide flexible companion blanket coverings having cut-out portions of approximate sizes to provide openings adapted to receive pipes, valves or projections extending at an angle to a pipe line. The flexible nature of these coverings in combination with their approximate sized openings adapts any one of them of a particular shape and approximate size to fit a variety of sizes, particularly with regard to the projections. In other words, blankets of an approximate size and shape are provided which are adapted to cover pipe lines having projections, and in view of their flexibility and the particular means of binding and lacing together, they can be brought into snug form-fitting relation to the pipes and projections, and thus a covering of an approximate size and shape can be made to fit various sized pipes and fittings in snug conforming relation.

The above and various other objects and advantages of this invention will be described and understood from the following detailed description taken in connection with the accompanying drawings which form a part of the specification.

Referring to the drawings, in which the same reference characters indicate like parts:

Fig. 1 shows a plan view of a portion of a piping system with fittings applied thereto.

Fig. 2 is a side elevation of Fig. 1 with the broken-off sections omitted.

Fig. 3 discloses a perspective of the companion fittings adapted to fit a cross.

Fig. 4 is a perspective view disclosing a fitting adapted to cover a T or valve.

Fig. 5 discloses a perspective of the companion members adapted to cover an elbow; and Fig. 6 is a perspective view of a portion of a fitting adapted to fit a straight line section of piping.

Generally speaking, these blankets or coverings comprise casings made of fire or heat-resisting material, such as a heavy asbestos cloth or fabric, the yarn or cords of which are reenforced with textile strands or fine wires, preferably the latter.

The casings for these blankets in their simplest form comprise inner and outer facings having the same shape, the inner being of less area than the outer. Sewed or connected to the corresponding marginal edges of the facings by means of reenforced asbestos twine or the like are boxing or spacing strips of fabric. The boxing strips of two of the opposing edges or ends of a blanket are more or less narrow and circular or curved in shape, which tends to give a finished blanket a curved shape adapting the same to fit a pipe. The other two opposing edges are connected by narrow straight boxing strips, thereby forming a casing for holding pliable fire or heat-resisting material, such as mineral wool, magnesia, or asbestos fibre, preferably the latter; however, the fitting may comprise a mixture of any of the above materials. After the covers are filled, they are quilted or tacked in numerous places to hold the filling in place, and anchor hooks are applied to certain of the tacking means and suitably placed for receiving lacing or tying means for binding the coverings over a pipe and to each other.

Coverings made as stated above are adapted to fit straight line sections of piping having no projection, such as lead-off pipes or valves. Coverings which are adapted to fit pipes having crosses, valves or lead-off pipes are made substantially as stated above, and differ therefrom in that one or both of the opposing sides of the coverings which are not connected by the curved boxing strips are notched or cut out, and consequently, the boxing strips that are sewed to these marginal edges following the contour of the cutaway portions of the facings will leave cutout portions in the finished blankets, which are adapted to fit members projecting from a pipe, as will hereinafter be more fully described.

Referring to Figs. 1 and 2, a pipe system is disclosed in dotted outline having straight line sections P, an elbow L, a T T and cross C, all having the customary butting and connecting flanges. Over the straight sections P are one piece pliable blankets 6, and over the parts C, T and L are fittings 7, 8 and 9, respectively, all of which will be hereinafter more fully described. The meeting edges of the fittings 6 are bound or tied together by suitable cords or wires 11 engaging the anchors or hooks 10, preferably set back from the meeting edges a substantial distance, as more clearly disclosed in Fig. 6, so that in view of the pliability of the coverings and the facing edges they may be more or less compressed between the anchors and the facing edges, thereby not only making a very tight and snug meeting face, but also adapting an oversized covering to be reduced in size and made to snugly fit an undersized pipe. On each of these coverings or fittings are anchors or hooks 20 adapted to be engaged by tie cords 21 for the purpose of closely binding adjoining fittings together. However, in view of the pliable or flexible nature of the covering, the adjoining end of one cover may be made to fit or lap over the adjoining end of another cover and then bound in close fitting relation thereover by the hooks and tying means 10 and 11.

Briefly stating, the coverings 6 are made in a one-piece blanket, and comprise two layers of heavy, reenforced heat-insulating fabric, such as asbestos cloth, having curveshaped spacing or boxing strips 33 connecting their corresponding ends and straight boxing strips 34 connecting their other corresponding ends, the strips being made of heat-insulating fabric. Between the layers is a stuffing of insulating material 17, which is quilted in numerous places to prevent shifting, and connected to certain of the quilting means, placed a substantial distance back from the meeting faces of the blanket, are hooks 10 adapted to receive lacings 11 for binding the blankets over the pipe.

Referring to Fig. 3, the companion members of the blankets 7 used for covering a cross are disclosed in an opposing relation to each other, or in the position they are placed with reference to each other upon being fitted on a cross. These companion members have the same shape and structure, and a description of one will suffice for the other. Each member has an outer covering 12 of asbestos fabric, and an inner covering 13, made of the same material and the same shape, but of a smaller area. To the upper and lower marginal edges of these coverings are attached semi-circular shaped spacing or boxing strips 14, which tend to give the finished cover a semi-circular shape. The other or end marginal edges of the coverings have cut-out portions at 15, and attached to these marginal edges and to the edges of the semi-circular end pieces 14 are boxing strips 15', which, due to following the outline of the cutout portions at 15 of the marginal edges of the coverings, form semi-circular openings at 15, which are adapted to snugly fit over pipes and flanges, as will be observed at 15 in Fig. 2.

The marginal edges of all the above coverings and strips are connected or sewed together with asbestos twine, cord or fine wire, as illustrated at 16, and the casing filled with asbestos fibre or other suitable insulating material, such as mineral wool or magnesia, or combinations of any of the above.

For the purpose of binding the companion members together, anchors or hooks 18 are placed a substantial distance back from the meeting faces for the same reasons as hereinabove stated with regard to the coverings 6, said hooks being engaged by tying cords or wires 19, as will be seen in Figs. 1 and 2. Also, anchors or hooks 20 are provided for the purpose of receiving lacings, cords or wires 21 for binding adjoining or abutting fittings together, as will be observed in Figs. 1 and 2.

All the above hooks are anchored to the covers by means of wires or cords passing through the insulating material and the walls of the members, and engage suitable washers 23, as is clearly shown in the cut-away portion, Fig. 4. By this construction, the cords or wires 22 have a double function of both anchoring the hook-like members, as well as tacking or quilting the insulating material in place in the coverings.

The coverings 7, in the preferred form, have been disclosed as separate companion members; however, these members may be attached or sewed together at one of the sides along the marginal edges of the boxing strips 15', either above or below the opening 15, thereby making what may be termed a one-piece covering which may be flexed and readily fitted over a pipe fitting.

Referring to Fig. 4, a detailed disclosure is made of the covering 8 adapted to fit a valve or T in a piping system. This covering is similar in form to the covering 7 and differs therefrom in that the companion covers are connected together at 30, and the boxing strips 32 are straight pieces having no semicircular formations midway their ends.

In the way of further detailed description of this covering, the outer and inner facings 12' and 13' of the companion members have the same shape, the latter being smaller in size or area than the outer covering. The inner and outer facings of the respective companion coverings are sewed or connected together at 30, and boxing strips 32 are provided at the free marginal edges. Connected to the upper marginal edges of the facings and boxing strips 32 is a circular strip 14'', and a boxing strip 31 is provided at the cut-out portion 31'. The lower marginal edges of the facings are connected by semi-circular pieces 14', similar in shape to the pieces 14 used in the fitting 7. By the above construction, it will be seen that the companion members of the covering are connected together by sewing the respective inner and outer facings together at 30, and this, in conjunction with strips 14'' and 31, provides what may be termed a one-piece semi-fitting flexible covering.

This covering is also provided with lacing and connecting hooks 18 and 20 placed a substantial distance back from the meeting faces for the same purposes as stated with reference to the covering 7.

In Fig. 5 will be seen a detailed view of a fitting adapted to cover an elbow. This fitting in the preferred form comprises two companion members having the same form and shape, and a description of one will suffice for the other. Each member has an outside fabric facing 25 and an inside fabric facing 26, both having the same form and shape, the inside facing having a smaller area than the outside facing. To the upper and lower marginal edges of these coverings are attached semi-circular shaped strips 27, and connected to the other marginal edges of the coverings and the semi-circular strips are boxing strips 28 and 29. The above parts, associated and connected together as stated, form a casing which can be filled with suitable insulating material, such as asbestos fibre or the like, to form a flexible fitting or covering. The same is provided with hooks 18 so that companion members can be laced together over an elbow, and with hooks 23 adapted to be engaged by cords or wires from an adjoining covering for binding the same closely together.

As stated above, this fitting has been disclosed in its preferred form as two companion members; however, it may be made in one piece by sewing the respective outside and inside facings of the companion members and strips 27 together at their meeting edges about the boxings 28. In this form the boxing strips 28 may be eliminated, and also, instead of sewing the meeting edges together, as stated above, the outside facings may be made in one piece; likewise, the inside facings and the strips 27 of the respective ends may be made in one piece members. As in the other fittings, the anchoring cords or wires for the hooks 18 and 20 perform the function of quilting or tying the insulating material in place.

In all the above fittings, the various pieces which are associated and connected together to form the casings for the insulating material are made of a flexible pliable sheet material preferably composed of a pure asbestos fabric or cloth, heavily constructed of specially prepared asbestos fibre yarn or cord of a high specific volume to withstand very high temperatures, the same in the preferred form being reenforced with strong strands of a heat and fire-resisting nature.

The cloth or fabric is cut into properly shaped pieces to make a desired shaped covering or fitting, and then connected or sewed together with a heat or fire-resisting cord or twine, preferably made of asbestos. However, the same may be wire or the like. With the pieces suitably shaped and sewed together, the desired shaped casing is formed, which is then stuffed or filled with insulating material, such as mineral wool, magnesia or asbestos fibre, preferably the latter; or it may consist of various combinations of the above.

In filling or stuffing the casings, they are shaped on templates, after which the insulating material is tacked or quilted in numerous places to hold the same in position, and hooks or anchoring means are connected to certain of the tacking or quilting members in such a way as to be adapted to be engaged by the means for lacing the companion members of a fitting together, and also to bind adjoining fittings together.

By the above method of construction, preformed insulating semi-shaped blankets or mattresses are made, which are not only adapted to be brought into form-fitting relation, but also, in view of their flexible and pliable nature, are adapted to be readily applied and bound in close fitting contact with each other, thereby eliminating air circulation, and providing an insulating covering which is very effective in resisting the transmission of heat.

It is understood that various changes and modifications may be made in details of construction and design of the above specifically described embodiments of the invention without departing from the spirit thereof, such changes and modifications being restricted only by the scope of the following claims.

What I claim is:

1. A heat insulating covering for pipe joints, comprising a casing member having inner and outer concentric layers of heavy pliable asbestos fabric with their corresponding ends connected together by means of curved flexible strips, the side edges of the layers having cut-out portions for the reception of interconnecting pipes and boxing strips connecting the side edges including the line along the cut-out portions, and fibrous insulating material filling the casing.

2. A heat insulating covering for pipe joints, comprising pliable companion members having casings consisting of inner and outer concentric layers of heat and fire-resisting fabric, boxing strips connected to the marginal edges of the layers, the boxing strips on the corresponding ends of the companion members being curved to conform to the area between the concentric layers, cut-out portions on the marginal edges of the members with the boxing strips following the contour of the cut-away portions, thereby providing openings for the reception of interconnecting pipes, fibrous fire and heat-resisting material in the casings, and means for connecting the companion members together.

3. An insulating covering for pipes and pipe fittings comprising pliant, semi-shaped blankets, each of said blankets being constructed of a fibrous insulating filling between two layers of heat-insulating fabric connected together at their marginal edges by means of boxing strips, said blankets being adapted to snugly fit and conform with said pipes and fittings, quilting means interconnecting said layers at numerous places certain of said quilting means including means for securing said blankets in position on said pipes and fittings, said means comprising members passing through said layers of heat-insulating fabric and said fibrous heat-insulating filling and having hooks secured to their outer ends to which suitable fastening means may be secured so that said blankets may be easily applied to said pipes and fittings or removed therefrom without injury to said blankets.

4. A heat insulating covering for pipe joints comprising a casing formed of inner and outer concentric layers of asbestos fabric, said casing being of an irregular configuration adapted to conform to the contours of the pipe joint, a filling of fibrous insulating material enclosed between said layers, cut out portions on the marginal edges of the casing for the reception of interconnecting pipes and boxing strips of asbestos fabric connecting the marginal edges of the concentric layers.

5. A heat insulating covering adapted to readily conform to the contour of pipes and interconnecting pipes and joints, comprising a pliable casing member having inner and outer concentric pliable facings of approximately the same shape, the inner facing being of lesser area than the outer, cut-out portions in the corresponding edges of the facings for the reception of interconnecting pipes, boxing strips of pliable material connecting the corresponding edges of the facings including the line along the cut-out portions, and pliable insulating material filling the casing.

Signed at Manville, in the county of Somerset and State of New Jersey this 7th day of December A. D. 1928.

JOHN H. REESE.